(12) United States Patent
Saito (10) Patent No.: US 6,811,211 B2
(45) Date of Patent: Nov. 2, 2004

(54) VEHICLE BODY FRONT STRUCTURE

(75) Inventor: Kuniyasu Saito, Atsugi (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/756,468

(22) Filed: Jan. 14, 2004

(65) Prior Publication Data

US 2004/0155488 A1 Aug. 12, 2004

(30) Foreign Application Priority Data

Feb. 7, 2003 (JP) .................................. P2003-031341

(51) Int. Cl.[7] .............................................. B62D 25/08
(52) U.S. Cl. ............. 296/203.02; 296/204; 296/187.09; 296/193.07
(58) Field of Search ...................... 296/203.01, 203.02, 296/204, 192, 187.09, 193.07

(56) References Cited

U.S. PATENT DOCUMENTS

| | | | | |
|---|---|---|---|---|
| 6,361,102 B1 | * | 3/2002 | Han ...................... | 296/203.02 |
| 6,398,292 B2 | * | 6/2002 | Tsuruta et al. ......... | 296/187.09 |
| 6,409,253 B2 | * | 6/2002 | Larsson et al. ........ | 296/187.09 |
| 6,655,728 B2 | * | 12/2003 | Sano et al. ............ | 296/187.09 |
| 6,695,392 B2 | * | 2/2004 | Stoffels et al. ......... | 296/187.09 |

FOREIGN PATENT DOCUMENTS

JP           10-119826           5/1998

* cited by examiner

Primary Examiner—Stephen Gordon
(74) Attorney, Agent, or Firm—McDermott Will & Emery LLP

(57) ABSTRACT

A vehicle body front structure is provided with a front side member, a dash panel, an extension member connected to the front side member at a rear side thereof and extending along the dash panel to have a lower curved section, a suspension member located below the front side member and having a rear end connected to the lower curved section of the extension member, an extension rear member located above a floor panel, and a floor member connected to the extension member at a rear side of the lower curved section of the extension member. The extension rear member has a closed cross-sectional structure that extends in the fore and aft direction of the vehicle body. The floor member is located above the extension rear member to be superposed on and connected to the extension rear member and has an upper wall with increased thickness.

11 Claims, 5 Drawing Sheets

VEHICLE BODY FRONT STRUCTURE

BACKGROUND OF THE INVENTION

The present invention relates to a vehicle body front structure and, more particularly, to a vehicle body front structure which has a extension member rearwardly and downwardly inclined from a rear end of a front side member.

Figure 1:
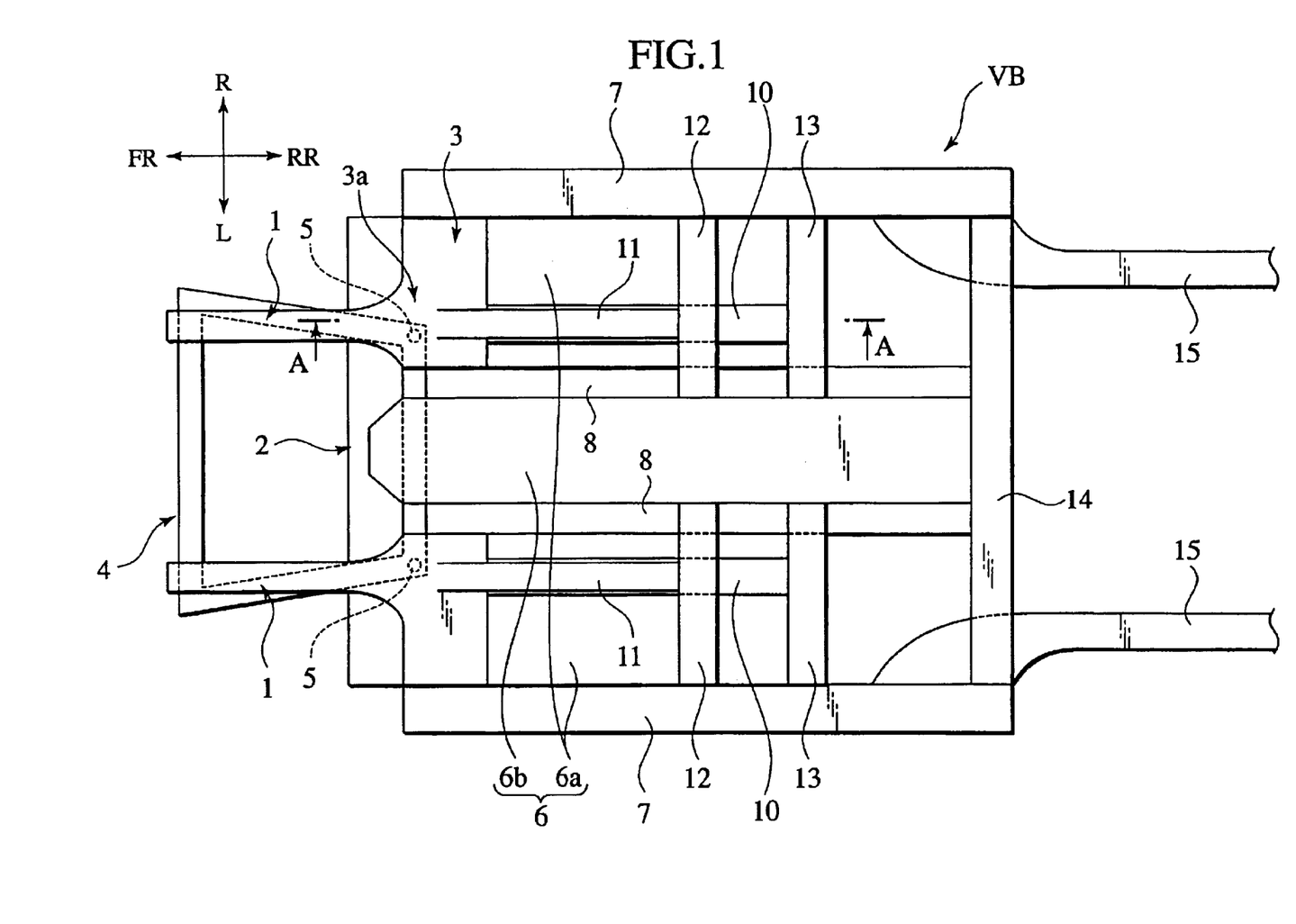
FIG. 1 is a plan view illustrating a chassis frame structure of a vehicle body of a first embodiment according to the present invention.

Japanese Patent Application Laid-Open Publication No. H10-119826 discloses a vehicle body front structure which, particularly, referring to FIG. 1 and associated description, has a structure that includes laterally spaced apart front side members extending in a fore and aft direction of a vehicle body, and extension members contiguous with rear ends of the front side members respectively, with the extension rear members being inclined rearward and downward along a dash panel and located beneath a floor panel.

SUMMARY OF THE INVENTION

However, upon careful studies undertaken by the inventor, with such a vehicle body front structure, when the front side members are applied with large load from a vehicle front due to frontal collisions, this load is delivered through the front side members and acts upon extension members that are inclined rearward and downward. Then, it is conceivable that bending moments occur in the extension members to cause the extension members to deform rearward about centers of the curved sections thereof, resulting in a tendency to cause the dash panel to move backward into a vehicle compartment.

For this reason, there is a need for conducting a study to minimize backward displacement of the dash panel resulting from load coming from the vehicle front.

One of measures for minimizing backward displacement of the dash panel is considered to include a technology to improve moment resistances on upper walls of the extension members.

But, in case where the extension members are placed beneath the floor panel and each of the extension members takes the form of a closed cross-sectional structure with its upper wall formed from the floor panel, a whole of the floor panel needs to have an increased thickness to enhance moment resistance, with resultant significant increase in weight.

To this end, if the extension members are located above the floor member, as far as the extension members concern, the upper walls of these components are able to have increased thickness without increasing the thickness of the floor panel.

However, although it is conceivable for the extension members to be formed in closed cross-sectional structures by cutting a sheet material, bending the same and jointing associated portions, in order for the upper walls to have the increased thickness, the extension members should entirely have the increased thickness, or the separate reinforcing plates should be jointed to only the upper walls, resulting in increase in weight and deterioration in assembling workability.

Therefore, the present invention has been completed upon such careful studies conducted by the present inventor and has an object to provide a vehicle body front structure that enables to restrict backward deformations of extension members resulting from load applied to a vehicle front without inducing excessive increase in weight and deterioration in assembling workability for thereby minimizing backward displacement of a dash section involving a dash panel.

To achieve the above object, in one aspect according to the present invention, a vehicle body front structure comprises: a front side member extending at a front portion of a vehicle body in a fore and aft direction of the vehicle body; a dash panel vertically extending in the vehicle body; an extension member connected to the front side member at a rear side thereof and extending along the dash panel to have a lower curved section rearwardly and downwardly inclined with respect to the vehicle body; a suspension member located below the front side member and having a rear end connected to the lower curved section of the extension member, an extension rear member located above a floor panel that extends in the fore and aft direction of the vehicle body and having a closed cross-sectional structure that extends in the fore and aft direction of the vehicle body; and a floor member connected to the extension member at a rear side of the lower curved section of the extension member, the floor member being located above the extension rear member to be superposed on and connected to the extension rear member while extending in the fore and aft direction of the vehicle body, and the floor member having an upper wall with increased thickness.

Stated another way, in anther aspect according to the present invention, a vehicle body front structure comprises: a front side member extending at a front portion of a vehicle body in a fore and aft direction of the vehicle body; a dash panel vertically extending in the vehicle body; an extension member connected to the front side member at a rear side thereof and extending along the dash panel to have a lower curved section rearwardly and downwardly inclined with respect to the vehicle body; a suspension member located below the front side member and having a rear end connected to the lower curved section of the extension member; an extension rear member located above a floor panel that extends in the fore and aft direction of the vehicle body and having a closed cross-sectional structure that extends in the fore and aft direction of the vehicle body; and a floor member connected to the extension member at a rear side of the lower curved section of the extension member, the floor member being located above the extension rear member to be superposed on and connected to the extension rear member while extending in the fore and aft direction of the vehicle body, and the floor member having means for receiving a force to be rearwardly applied with respect to the vehicle body resulting from a force rearwardly applied to the front side member and the suspension member with respect to the vehicle body.

Other and further features, advantages, and benefits of the present invention will become more apparent from the following description taken in conjunction with the following drawings.

DETAILED DESCRIPTION OF THE PREFERRED EMBODIMENTS

Hereunder, a vehicle body front structure of each of embodiments according to the present invention is described below in detail with reference to the accompanying drawings. Also, throughout the drawings, reference symbol "FR" designates a forward direction of a vehicle body, "RR" designates a rearward direction of the vehicle body, "R" designates a rightward of the vehicle body, "L" designates a leftward direction of the vehicle body, "UPR" designates an upward direction of the vehicle body and "LWR" designates a downward direction of the vehicle body, respectively.

(First Embodiment)

Now, a vehicle body front structure of a first embodiment of the present invention is described in detail.

Figure 2:
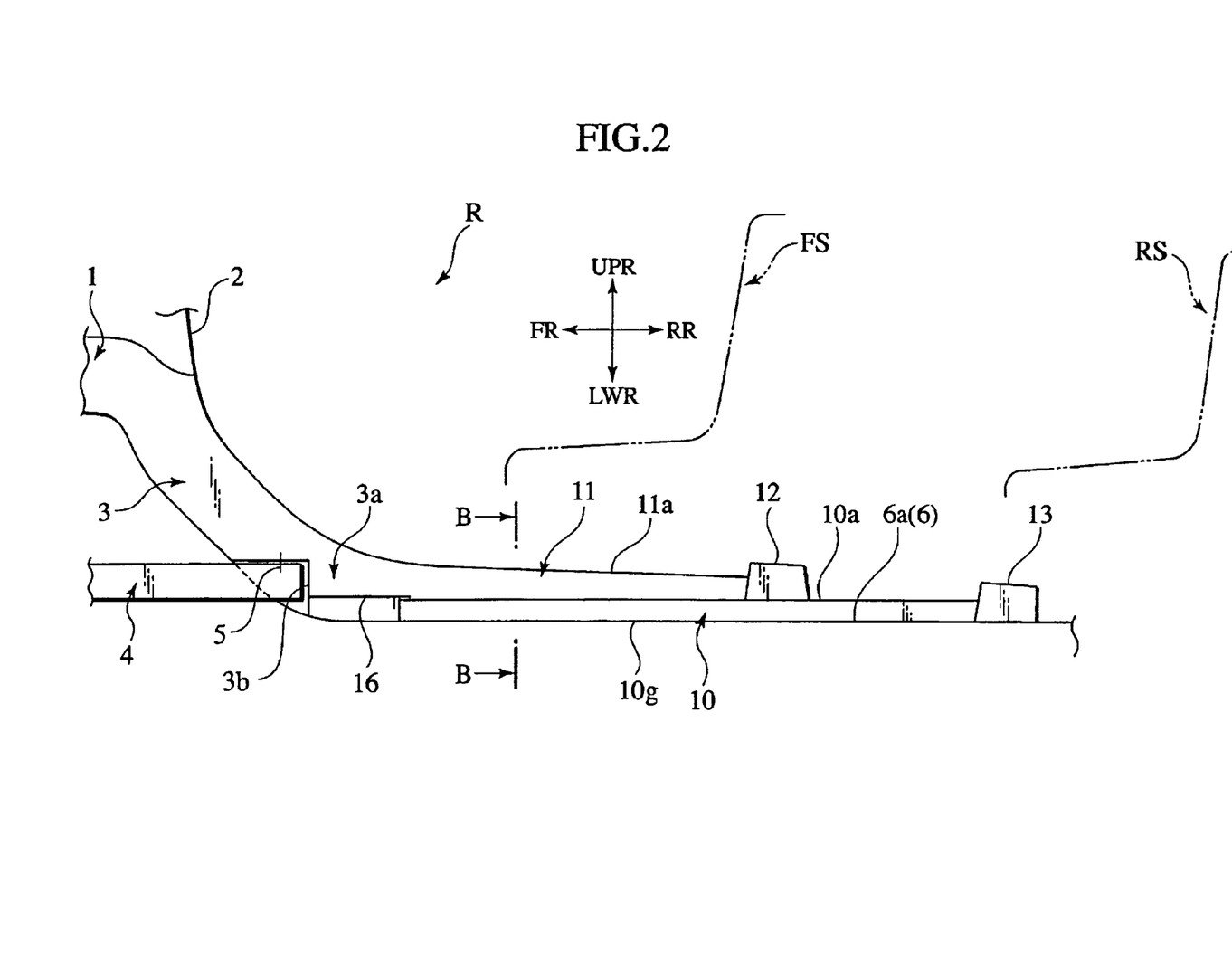
FIG. 2 is a typically enlarged cross sectional view taken along A-A of FIG. 1 in the present embodiment.
Figure 3:
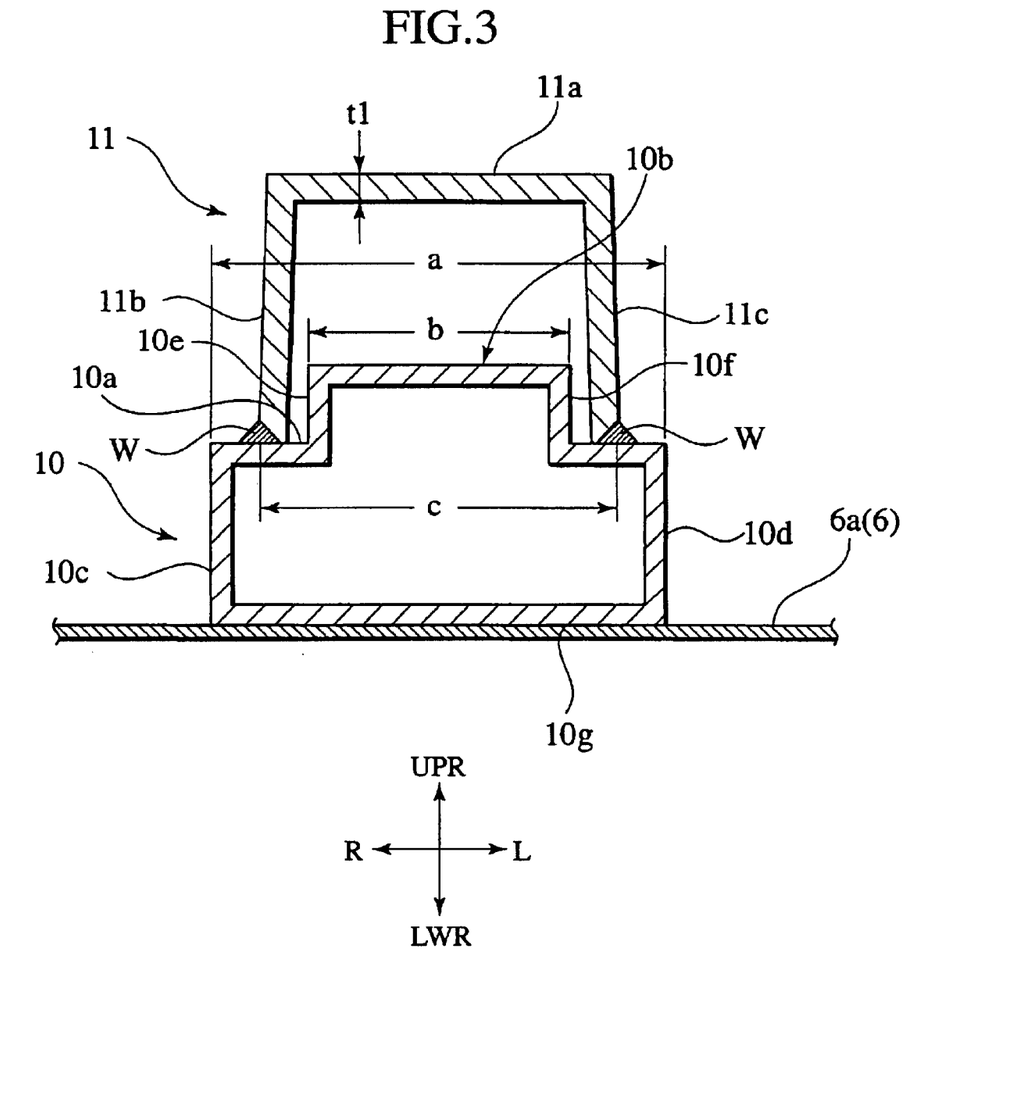
FIG. 3 is an enlarged cross sectional view taken along B-B of FIG. 2 in the present embodiment.
Figure 4:
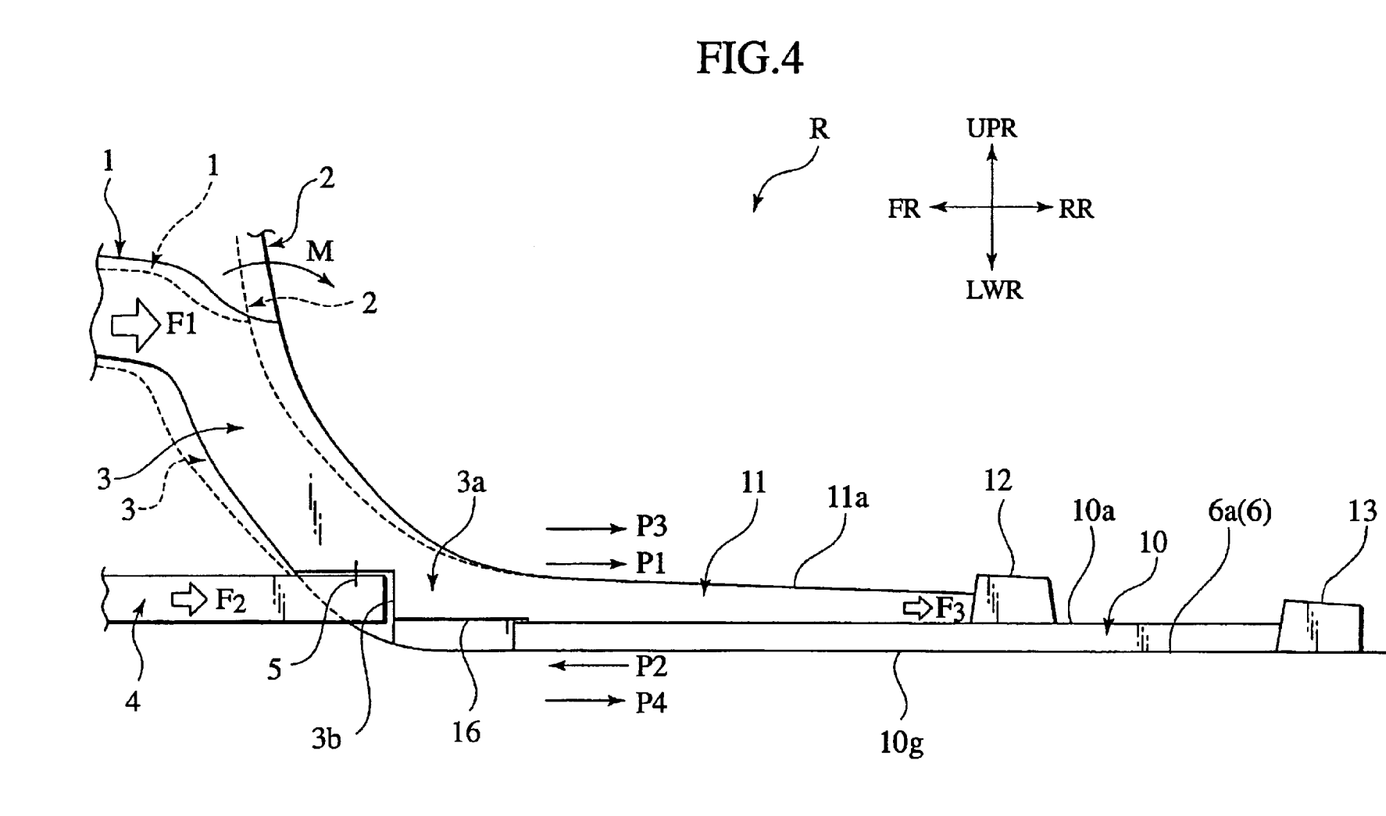
FIG. 4 is a typically enlarged cross sectional illustrating an operating condition of the frame structure when applied with impact load in the present embodiment, with positional relationship corresponding to the structure shown in FIG. 2.

FIG. 1 is a plan view showing a chassis frame structure of a vehicle body VB of the presently filed embodiment, FIG. 2 a typically enlarged cross sectional view taken on line A-A of FIG. 1, FIG. 3 an enlarged cross sectional view taken on line B-B of FIG. 2, and FIG. 4 a typically enlarged cross sectional view showing an operating condition of the chassis frame structure upon receipt of impact load, with the positional relationship corresponding to the structure of FIG. 2. Incidentally, in principle, the vehicle body front structure of the presently filed embodiment is formed in structure in left and right symmetry with respect to a fore and aft direction of the vehicle body, except for a particular case which is specialized, and internally has a vehicle compartment R.

As shown in FIGS. 1 and 2, the vehicle body front structure of the presently filed embodiment includes a pair of left and right front side members 1, 1, which are located in front of the vehicle body VB at both sides thereof and laterally spaced apart in a vehicle widthwise direction (in left and right directions) while extending in the fore and aft direction of the vehicle body VB. Connected to rear ends of the front side members 1 are a pair of extension members 3, 3 that extend along a dash panel 2. The dash panel 2 has at last one general surface standing upright from a floor panel, which will be described below, and vertically extends in the vehicle body VB while extending in the vehicle widthwise direction. Each extension member 3 has a lower curved section 3 rearwardly and downwardly inclined along the dash panel 2.

Positioned below the front side members 1 are suspension members 4 each formed in a rectangular shape in plan view and supporting a suspension arm which is not shown. The suspension member 4 has a front end connected to a front end of the associated front side member 1 by means of a mount component or a fastening component, both of which are not shown, and a rear end connected to the lower curved section 3a of the associated extension member 3 through a mount component 5.

The lower curved sections 3a of the respective extension members 3 straddle between and are connected to front ends of side sills 7, which extend in the fore and aft direction of the vehicle body at both sides of the floor panel 6 that expands in the vehicle widthwise direction and extends in the fore and aft direction of the vehicle body, and front ends of tunnel members 8 that are spaced apart with a given distance, in a central area of the floor panel 6, in opposition to the side sills 7. Further, the tunnel members 8 are placed in a pair to oppose one another in the vehicle widthwise direction.

The floor panel 6 is comprised of a pair of floor side panels 6a, 6a, each of which is positioned between each side sill 7 and each tunnel member 8, and a floor center panel 6b positioned between the pair of tunnel members 8, 8 placed in opposition to one another. This floor center panel 6b forms a tunnel section.

Here, with the presently filed embodiment, an extension rear member 10 is disposed above each floor side panel 6a on an extension line of the associated front side member 1 in a rear area thereof and has a closed cross-sectional structure that extends in the fore and aft direction of the vehicle body. Each extension rear member 10 is connected to the associated floor side panel 6a.

Further, connected to rear portions of the lower curved sections 3a of the respective extension members 3 are floor members 11 that are formed of light alloy such as aluminum by casting. The floor members 11 are superposed on and connected to upper walls of the associated extension rear members 10 and, as shown in FIG. 3 in detail, each includes an upper wall 11a with an increased thickness t1 greater than that of each of both vertical side walls 11b, 11c.

Disposed on the floor side panels 6a so as to straddle between the side sills 7 and the tunnel members 8 are a pair of first moss members 12, 12 that are positioned below front seats FS and extend in the vehicle widthwise direction. The first cross members 12 are connected to the upper walls of the associated extension rear members 10 and also connected to rear ends of the floor members 11 associated with the first cross members 12, respectively.

Moreover, disposed on the floor side panels 6a in rearward areas of the associated first cross members 12 so as to straddle between the side sills 7 and the tunnel members 8 are a pair of second cross members 13, 13 that extend in the vehicle widthwise direction. The second cross members 13 are connected to the upper walls of the associated floor side members 6a and also connected to rear ends of the extension rear members 10 associated with the second cross members 13, respectively.

Additionally, a rear seat cross member 14 straddles between rear ends of the pair of side sills 7, 7 and is connected thereto in a rearward area of the second cross members 13. Rear ends of the respective tunnel members 8 are connected to the rear seat moss member 14, and a pair of rear side members 15, 15 extend rearward from rear ends of the associated side sills 7 at inside areas thereof, respectively.

By the way, a pair of left and right reinforces 16, 16 are located so as to extend rearward from front walls 3b of the lower curved sections 3a, respectively, as shown in FIG. 2. The respective reinforces 16 have rear ends connected to upper corner portions on front ends of the associated extension rear members 10.

Further, each extension rear member 10 is formed from an extrusion material of light alloy such as aluminum in a closed cross section and, as shown in FIG. 3, has an upper wall 10a having a central area formed with flat portion that protrude upward in a protruded section 10b while the floor member 11 is formed in a reverse U-shaped cross section.

Furthermore, it is determined such that a distance "c" between the vertical side walls 11b, 11c of the floor member 11, formed in the reverse U-shaped cross section, is provided between a distance "a", between the both vertical side walls 10c, 10d of the extension rear member 10, and a distance "b" between the both vertical side walls 10e, 10f of the protruding portion 10b and set to be larger than the distance "b" and smaller than the distance "a" (as expressed by a >c>b). Also, lower ends of both the vertical side walls 11b, 11c of the floor member 11 are connected to the upper wall 10a, on both sides thereof, of the extension rear member 10 by welding W such that the protruding portion 10b is interleaved.

Incidentally, the front side members 1, the extension members 3 and the floor members 11 may take a structure wherein separate components are connected to one another by welding or a structure wherein all components are formed from the same material in an identical fabrication method to be formed in a unitary body.

Now, operation of the vehicle front structure of the presently filed embodiment set forth above is described below.

First, when applied with large load at the front of the vehicle body due to frontal collision, load F1 acts upon the front side members 1 while load F2 acts upon the suspension members 4 as shown in FIG. 4. It doesn't matter if such loads are applied to both the left and right sides of the vehicle body VB and, for the sake of convenience of description, description is typically made of operation in connection with one of the left and right sides of the vehicle body with reference to FIG. 4.

Then, due to the presence of load F1 acting upon the front side member 1, bending moment M occurs in the extension member 3 so as to cause the same to deform about a center of the lower curved section 3a from a position indicated in a dotted line in the figure toward a position indicated by a solid line. This bending moment M causes a compression force P1 to act upon the upper wall 11a of the floor member 11, while causing a tension force P2 to act upon a lower wall 10g of the extension rear member 10.

Further, due to the presence of load F2 applied to the suspension member 4 in a horizontal direction, compression forces P3, P4 act upon the upper wall 11a of the floor member 11 and the lower wall 10g of the extension rear member 10, respectively.

For this reason, the tension force P2 caused by bending moment M and the compression force P4 caused by load F2 cancel one another to allow the lower wall 10g of the extension rear member 10 to enhance a sufficient strength, while a resultant force is created on the upper wall 11a of the floor member 11 with the compression force P1 caused by bending moment M and the compression force P3 caused by load F2.

Accordingly, although the upper wall 11a of the floor member 11 needs to have a relatively large strength, the presence of the extension rear members 10 connected to the floor member 11 to provide an increased strength while permitting the upper walls 11a to have increased thickness enables section moduli and moment resistances of the floor members 11 to be improved for thereby enhancing a sufficiently increased strength.

Here, due to the presence of the floor members 11 formed from aluminum alloy by casting, as the floor members 11 are able to allow only the upper walls 11a to have the increased thickness and suffice to provide a required strength with an increase in weight at a minimum extent without increasing the thickness of the both vertical walls 11b, 11c, it becomes possible to suppress the extension members 10 from being deformed rearward, due to the impact load applied to the vehicle front area, without inducing any excessive increase in weight and deterioration in assembling workability, thereby enabling reduction in backward displacement of the dash panel section involving the dash panel 2.

Further, the presently filed embodiment has, in addition to advantageous effects described above, a capability in that since the rear ends of the floor members 11 are connected to the first cross members 12 that are positioned beneath the front seats and in turn connected to the upper sides of the extension rear members 10, the impact load applied to the floor members 11 at the front of the vehicle body is dissipated to the first cross members 12. Consequently, in an area of the vehicle body rearward of the first cross members 12, even in the presence of only the extension rear members 10 placed over the upper wall of the floor panel 6, the vehicle body is able to maintain the strength at a sufficiently high level. In its turn, the floor members 11 can be removed from a foot area of rear seat occupants, enabling an adequate space to be enhanced at the feet of the occupants of the rear seat RS.

Furthermore, since the rear ends of the extension rear members 10 are connected to the second cross members 13 that are disposed rearward of the first cross members 12 in the vehicle body, the impact load applied to the extension rear members 10 are dissipated to the second cross members 13 in a final stage, enabling the rear area of the floor panel 6 to enhance a required strength.

Moreover, since the reinforces 16 are placed in a way to extend from the lower curved sections 3a of the extension members 3 to the rear areas of the vehicle body and the rear ends of the reinforces 16 are connected to the front ends of the extension rear members 10, the bending moment M resulting in the lower curved section 3a of the extension rear member 3 due to the impact load applied to the front area of the vehicle body and the horizontal force F2 applied from the suspension member 4 can be efficiently transferred to the extension rear member 10.

Accordingly, it becomes possible to effectively restrict the extension member 3 from being deformed, resulting in a capability of reducing backward displacement of the dash panel 2 and restricting a vehicle compartment R from being deformed.

Moreover, due to the presence of the distance "c" between both the vertical side walls 11b, 11c of the floor member 11 set to lie between the distance "a", between both the vertical side walls 10c, 10d of each extension rear member 10, whose central area of the upper wall 10a is formed with the protruding portion 10b, and the distance "b" between both the vertical side walls 11b, 11c of the floor member 11 (as expressed by a >c>b) whereupon the lower ends of both the vertical side walls 11b, 11c, between which the protruding portion 10b is interleaved, of the floor member 11 are connected to the both sides of the upper wall 10a of the extension rear member 10, it is possible to increase a bending rigidity of the extension rear member 10 because of the protruding portion 10b formed on the upper wall 10a. In addition to such advantage, when in connecting the floor member 11 to the extension rear member 10, the protruding portion 10b can be accommodated inside the floor member 11, it is possible to avoid the protruding portion 10b from narrowing the space at the occupant's feet in the front seat which is shown by a double dot line in FIG. 2.

(Second Embodiment)

Figure 5:
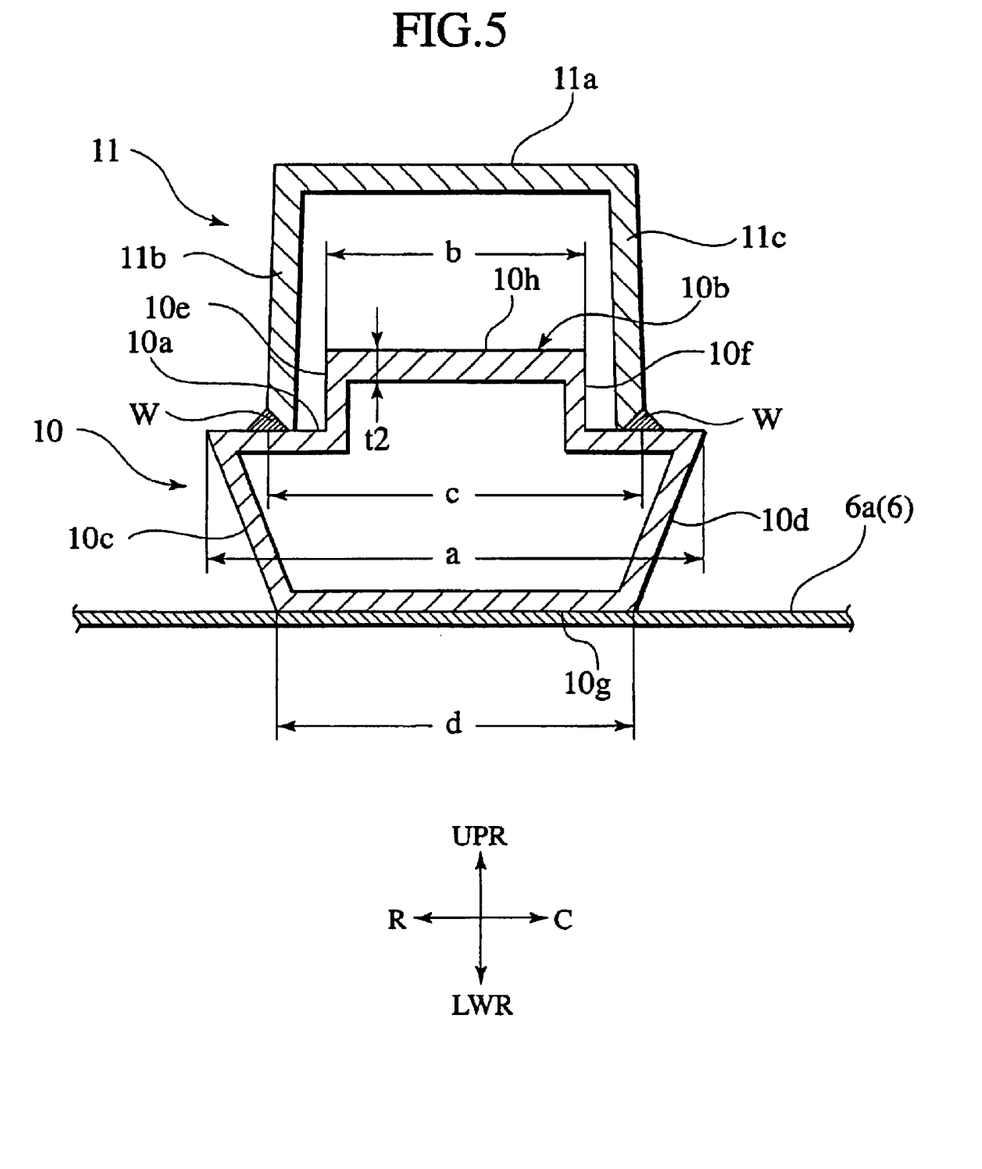
FIG. 5 is a cross sectional view illustrating a coupling condition between an extension rear member and a floor member in a second embodiment according to the present invention, with positional relationship corresponding to the structure shown in FIG. 3.

Next, a vehicle body front structure of a second embodiment is described below in detail. FIG. 5 is a cross sectional view illustrating a connecting structure between the extension rear member 10 and the floor member 11 in the presently filed embodiment, with the positional relationship corresponding to FIG. 3. The vehicle body front structure of the presently filed embodiment has the same fundamental structure as that of the first embodiment but differs in that the lower wall 10g of the extension rear member 10 is formed to have a width "d" narrower than the width "a" of the upper wall 10a. Hereinafter, while aiming at such differing points, the same component parts bear like reference numerals and description of the same component parts is suitably omitted or simplified.

That is, in the presently filed embodiment, when forming the extension rear member 11 having the lower wall 10g with the narrowed width "d", the upper wall 10a and the lower wall 10g are connected to one another with the vertical side walls 10c, 10d in left and right symmetry so as to have a cross sectional shape in an isosceles trapezoid profile.

Further, in the presently filed embodiment, the extension rear member 10 is also formed from extruded material such as aluminum alloy.

Accordingly, with the vehicle body front structure of the presently filed embodiment, to the extent in that the width "d" of the lower wall 10g of the extension rear member 10 is narrowed, the weight of the extension rear member 10 is decreased and, to the extent in that the resulting weight is decrease the upper wall 10h of the protruding portion 10b protruding from the central area of the upper wall 10a is formed to have an increased thickness t2 whereby it becomes possible to improve a section modulus and a moment resistance while permitting a center of gravity of the extension rear member 10 to be shifted upward without increasing a total weight of the extension rear member 10.

As set forth above, according to the structures of the various embodiments, in a case where the front side members and the suspension members are applied with the impact load at the front of the vehicle, a compression force acts upon the upper walls of the floor members due to the bending moments of the extension members and a tension force acts upon the lower walls of the extension rear members. Also, due to the occurrence of load applied to the suspension members in the horizontal direction, the compression forces come to act upon the upper walls of the floor members and the lower walls of the extension rear members, respectively.

For this reason, although the tension force and the compression force cancel each other at the lower walls of the extension rear members to enable a sufficient strength to be enhanced, while the resulting force is created on the upper walls of the floor members due to the compression forces caused by the bending moments and the compression forces resulting from the suspension members, the presence of the extension rear members connected to the floor members and the increased thickness of the upper walls of the floor members formed of light alloy by casting enables the section moduli and the moment resistances of the floor members to be improved with a resultant enhancement in a sufficient strength.

When this takes place, since only the upper walls of the floor members are able to have the increased thickness, the increased strength is suffice to be achieved by increasing the weight to the minimum extent and it becomes possible to preclude the extension members from suffering from backward deformation as a result of load applied to the front area of the vehicle body without causing excessive increase in weight and deterioration in assembling workability, thereby enabling backward displacement of the dash section to be eliminated.

The entire content of a Patent Application No. TOKUGAN 2003-031341 with a filing date of Feb. 7, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle body front structure comprising:
    a front side member extending at a front portion of a vehicle body in a fore and aft direction of the vehicle body;
    a dash panel vertically extending in the vehicle body;
    an extension member connected to the front side member at a rear side thereof and extending along the dash panel to have a lower curved section rearwardly and downwardly inclined with respect to the vehicle body;
    a suspension member located below the front side member and having a rear end connected to the lower curved section of the extension member;
    an extension rear member located above a floor panel that extends in the fore and aft direction of the vehicle body and having a closed cross-sectional structure that extends in the fore and aft direction of the vehicle body; and
    a floor member connected to the extension member at a rear side of the lower curved section of the extension member, the floor member being located above the extension rear member to be superposed on and connected to the extension rear member while extending in the fore and aft direction of the vehicle body, and the floor member having an upper wall with increased thickness.

2. The vehicle body front structure according to claim 1, wherein the front side member is located on each of both sides in a widthwise direction of the vehicle body, and in correspondence therewith, the extension member, the suspension member, the extension rear member and the floor member are located on each of both sides in the widthwise direction of the vehicle body to be in left and right symmetry with respect to the vehicle body.

3. The vehicle body front structure according to claim 1, wherein the floor member is formed of light alloy by casting.

4. The vehicle body front structure according to claim 1, further comprising a first cross member extending in a widthwise direction of the vehicle body and located above the extension rear member,
    wherein a rear end of the floor member is connected to the first cross member.

5. The vehicle body front structure according to claim 4, wherein the first cross member is located below a front seat.

6. The vehicle body front structure according to claim 4, further comprising a second cross member located at a rear side of the first cross member in the vehicle body and extending in the widthwise direction of the vehicle body while being located above the floor panel,
    wherein a rear end of the extension rear member is connected to the second cross member.

7. The vehicle body front structure according to claim 1, further comprising a reinforce, a front end of which is connected to the lower curved section of the extension member,
    wherein a rear end of the reinforce is connected to a front end of the extension rear member.

8. The vehicle body front structure according to claim 1, wherein the extension rear member has a cross sectional shape having a upper portion, a central area of which is formed with a protruding portion upwardly protruding with respect to the vehicle body, the floor member has a reverse U-shaped cross sectional shape, and lower ends of a pair of vertical portions of the reverse U-shaped cross sectional shape of the floor member are connected to both sides of the upper portion of the cross sectional shape of the extension rear member so as to allow the protruding portion thereof to be interleaved.

9. The vehicle body front structure according to claim 8, wherein when "a" is a distance between a pair of vertical portions of the cross sectional shape of the extension rear member, "b" is a distance between a pair of vertical portions of the protruding portion of the upper portion of the cross sectional shape of the extension rear member and "c" is a distance between the pair of vertical portions of the cross sectional shape of the floor member, then a formula is established as a>c>b.

10. The vehicle body front structure according to claim 8, wherein a lower portion of the extension rear member is narrower in width than the upper portion thereof.

11. A vehicle body front structure comprising:

a front side member extending at a front portion of a vehicle body in a fore and aft direction of the vehicle body;

a dash panel vertically extending in the vehicle body;

an extension member connected to the front side member at a rear side thereof and extending along the dash panel to have a lower curved section rearwardly and downwardly inclined with respect to the vehicle body;

a suspension member located below the front side member and having a rear end connected to the lower curved section of the extension member;

an extension rear member located above a floor panel that extends in the fore and aft direction of the vehicle body and having a closed cross-sectional structure that extends in the fore and aft direction of the vehicle body; and a floor member connected to the extension member at a rear side of the lower curved section of the extension member, the floor member being located above the extension rear member to be superposed on and connected to the extension rear member while extending in the fore and aft direction of the vehicle body, and the floor member having means for receiving a force to be rearwardly applied with respect to the vehicle body resulting from a force rearwardly applied to the front side member and the suspension member with respect to the vehicle body.

* * * * *